United States Patent
Yadav et al.

(10) Patent No.: US 11,921,584 B2
(45) Date of Patent: *Mar. 5, 2024

(54) SYSTEM AND METHOD FOR INSTANT ACCESS AND MANAGEMENT OF DATA IN FILE BASED BACKUPS IN A BACKUP STORAGE SYSTEM USING TEMPORARY STORAGE DEVICES

(71) Applicant: EMC IP Holding Company LLC, Hopkinton, MA (US)

(72) Inventors: Sunil Yadav, Bangalore (IN); Ravi Vijayakumar Chitloor, Bengaluru (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/383,100

(22) Filed: Jul. 22, 2021

(65) Prior Publication Data

US 2022/0398164 A1 Dec. 15, 2022

(30) Foreign Application Priority Data

Jun. 9, 2021 (IN) .............................. 202141025663

(51) Int. Cl.
*G06F 16/00* (2019.01)
*G06F 9/54* (2006.01)
(Continued)

(52) U.S. Cl.
CPC .......... *G06F 11/1448* (2013.01); *G06F 9/541* (2013.01); *G06F 11/1451* (2013.01);
(Continued)

(58) Field of Classification Search
CPC . G06F 11/1458; G06F 16/188; G06F 2201/84
(Continued)

(56) References Cited

U.S. PATENT DOCUMENTS

| 6,185,574 B1 | 2/2001 | Howard et al. |
| 7,694,103 B1 | 4/2010 | Kushwah |

(Continued)

FOREIGN PATENT DOCUMENTS

| WO | 2011002777 A2 | 1/2011 |
| WO | 2013086040 A2 | 6/2013 |

(Continued)

OTHER PUBLICATIONS

Lipika Deka et al., "Consistent Online Backup in Transactional File Systems", Nov. 2014, pp. 2676-2688, vol. 26, Issue: 11 (13 pages).

(Continued)

*Primary Examiner* — Monica M Pyo
(74) *Attorney, Agent, or Firm* — Chamberlain, Hrdlicka, White, Williams & Aughtry; Aly Z. Dossa

(57) ABSTRACT

A method for managing file based backups (FBBs) includes obtaining, by a FBB metadata file manager and by an application, a file request for a file stored in a FBB, wherein the FBB is stored in a backup storage system, identifying, using a FBB metadata file of the FBB, a storage location of the file, initiating generation of a temporary storage device, storing a copy of the file in the temporary storage device using the storage location and the FBB, and initiating, after the storing, access to the copy of the file for the application.

11 Claims, 10 Drawing Sheets

(51) Int. Cl.
  *G06F 11/14* (2006.01)
  *G06F 16/14* (2019.01)
  *G06F 16/172* (2019.01)
  *G06F 16/178* (2019.01)
  *G06F 16/188* (2019.01)
(52) U.S. Cl.
  CPC ........ *G06F 11/1458* (2013.01); *G06F 16/148* (2019.01); *G06F 16/172* (2019.01); *G06F 16/178* (2019.01); *G06F 16/188* (2019.01); *G06F 16/192* (2019.01); *G06F 2201/82* (2013.01); *G06F 2201/84* (2013.01)
(58) Field of Classification Search
  USPC ........................................................ 707/654
  See application file for complete search history.

(56) References Cited

U.S. PATENT DOCUMENTS

| | | | |
|---|---|---|---|
| 8,037,032 | B2 | 10/2011 | Pershin et al. |
| 9,171,002 | B1 | 10/2015 | Mam et al. |
| 9,348,827 | B1 | 5/2016 | Patwardhan et al. |
| 9,424,137 | B1* | 8/2016 | Mam ................... G06F 11/1456 |
| 9,569,446 | B1* | 2/2017 | Feathergill ............ G06F 16/128 |
| 10,007,445 | B2 | 6/2018 | Nithrakashyap et al. |
| 10,114,705 | B1 | 10/2018 | Kumar |
| 10,146,629 | B1* | 12/2018 | Yadav ................. G06F 11/1461 |
| 10,241,870 | B1* | 3/2019 | Beatty ................... G06F 16/903 |
| 10,346,256 | B1* | 7/2019 | Levin-Michael ..... H04L 9/3239 |
| 10,372,547 | B1 | 8/2019 | Zhu et al. |
| 10,642,790 | B1* | 5/2020 | Brenner ................ G06F 16/144 |
| 11,340,824 | B1 | 5/2022 | Yadav et al. |
| 11,513,921 | B1* | 11/2022 | Yadav ................. G06F 9/45541 |
| 2004/0028042 | A1 | 2/2004 | Srinivasan et al. |
| 2005/0078196 | A1 | 4/2005 | Okamoto |
| 2005/0166082 | A1 | 7/2005 | Williams et al. |
| 2005/0246398 | A1 | 11/2005 | Barzilai et al. |
| 2008/0124050 | A1 | 5/2008 | Deschamp et al. |
| 2009/0276591 | A1 | 11/2009 | Mu et al. |
| 2010/0077161 | A1 | 3/2010 | Stoakes et al. |
| 2014/0181579 | A1 | 6/2014 | Whitehead et al. |
| 2015/0127804 | A1 | 5/2015 | Kripalani et al. |
| 2016/0127307 | A1 | 5/2016 | Jain et al. |
| 2016/0188582 | A1 | 6/2016 | Sprague et al. |
| 2016/0378614 | A1 | 12/2016 | Thanasekaran |
| 2017/0090770 | A1 | 3/2017 | Minamiura et al. |
| 2018/0295400 | A1 | 10/2018 | Thomas et al. |
| 2018/0322017 | A1 | 11/2018 | Maccanti et al. |
| 2019/0278663 | A1 | 9/2019 | Mehta et al. |
| 2019/0324661 | A1 | 10/2019 | Kottomtharayil et al. |
| 2020/0245034 | A1 | 7/2020 | Dunker et al. |
| 2021/0240569 | A1 | 8/2021 | Chopra et al. |
| 2021/0326220 | A1 | 10/2021 | Srinivasan et al. |
| 2021/0406129 | A1 | 12/2021 | Zheng et al. |
| 2022/0245034 | A1 | 8/2022 | Nara et al. |
| 2022/0382641 | A1* | 12/2022 | Chopra ............... G06F 16/1748 |

FOREIGN PATENT DOCUMENTS

| | | |
|---|---|---|
| WO | 2015110171 A1 | 7/2015 |
| WO | 2015142676 A1 | 9/2015 |
| WO | 2018081737 A1 | 5/2018 |
| WO | 2019099446 A1 | 5/2019 |

OTHER PUBLICATIONS

Jing Xing et al, Memory Based Metadata Server for Cluster File Systems, 2008 Seventh International Conference on Grid and Cooperative Computing, Oct. 2008, pp. 287-291, 5 pages.

* cited by examiner

SYSTEM AND METHOD FOR INSTANT ACCESS AND MANAGEMENT OF DATA IN FILE BASED BACKUPS IN A BACKUP STORAGE SYSTEM USING TEMPORARY STORAGE DEVICES

BACKGROUND

Computing devices in a system may include any number of internal components such as processors, memory, and persistent storage. The storage of data across multiple computing devices may require significant use of such internal components. Performing deduplication on such data prior to storage may improve the overall operation of such computing devices.

SUMMARY

In general, in one aspect, the invention relates to a method for managing file based backups (FBBs). The method includes obtaining, by a FBB metadata file manager and by an application, a file request for a file stored in a FBB, wherein the FBB is stored in a backup storage system, identifying, using a FBB metadata file of the FBB, a storage location of the file, initiating generation of a temporary storage device, storing a copy of the file in the temporary storage device using the storage location and the FBB, and initiating, after the storing, access to the copy of the file for the application.

In general, in one aspect, the invention relates to a non-transitory computer readable medium that includes computer readable program code, which when executed by a computer processor enables the computer processor to perform a method for managing file based backups (FBBs). The method includes obtaining, by a FBB metadata file manager and by an application, a file request for a file stored in a FBB, wherein the FBB is stored in a backup storage system, identifying, using a FBB metadata file of the FBB, a storage location of the file, initiating generation of a temporary storage device, storing a copy of the file in the temporary storage device using the storage location and the FBB, and initiating, after the storing, access to the copy of the file for the application.

In general, in one aspect, the invention relates to a system that includes a processor and memory that includes instructions, which when executed by the processor, perform a method. The method includes obtaining, by a FBB metadata file manager and by an application, a file request for a file stored in a FBB, wherein the FBB is stored in a backup storage system, identifying, using a FBB metadata file of the FBB, a storage location of the file, initiating generation of a temporary storage device, storing a copy of the file in the temporary storage device using the storage location and the FBB, and initiating, after the storing, access to the copy of the file for the application.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
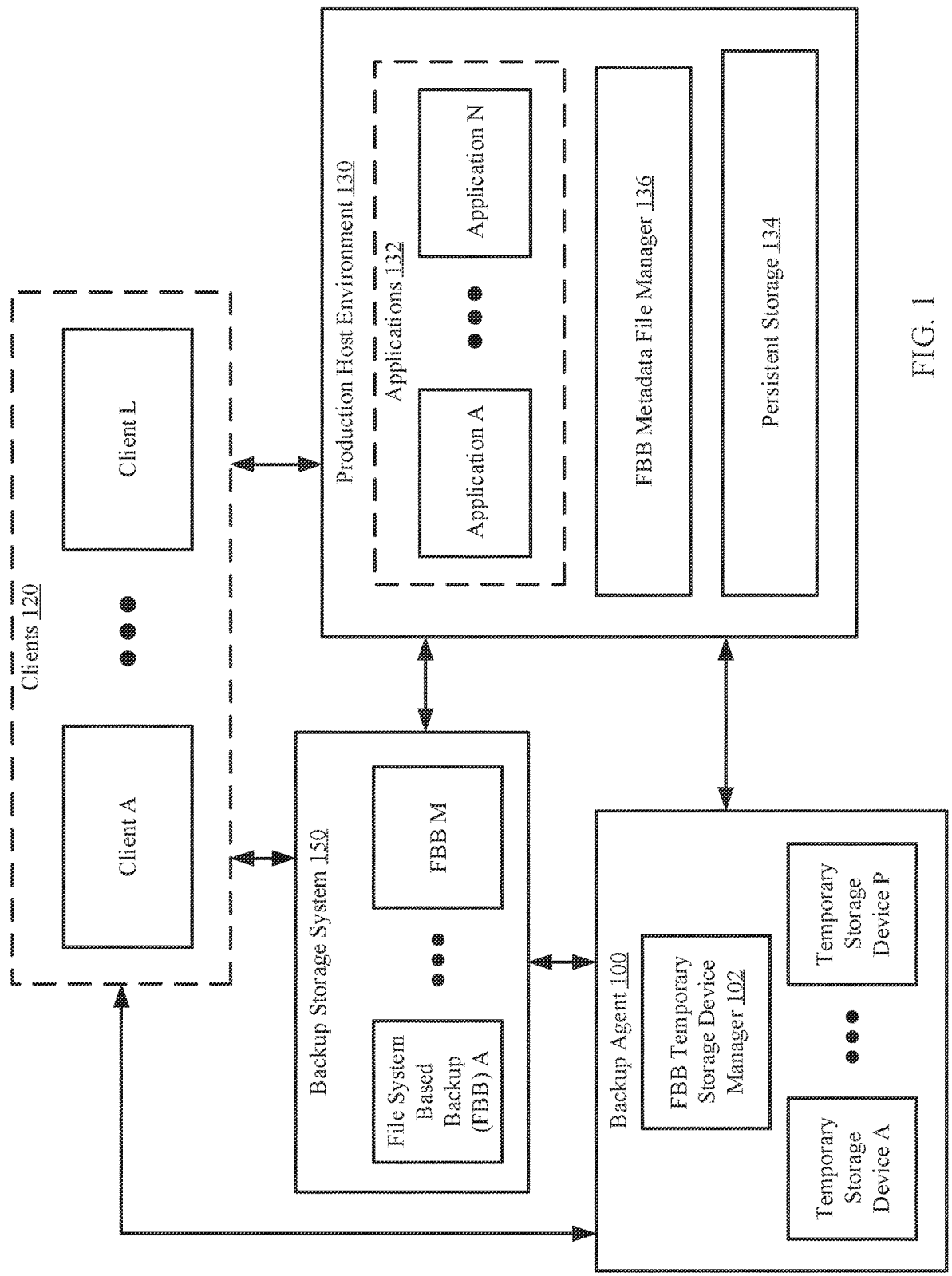
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing file based backups. Embodiments of the invention relate to a system for utilizing a file based backup (FBB) metadata file of a FBB stored in a backup storage system to enable access to the data of the FBB by an application managing the file system corresponding to the FBB. The application may operate from a production host environment that is operatively connected to the backup storage system. The FBB metadata file may be utilized by obtaining attributes corresponding to the data in the FBB, including the storage location, file name, and file size, and allowing access to those attributes by the applications. A FBB metadata file manager executing on the production host environment may utilize the obtained attributes to enable access to the data (e.g., the files) in the FBB by the applications. For example, the FBB metadata file manager may implement a virtual file system that specifies the files in the file based backup and the storage location in the backup storage system.

Embodiments of the invention further may include a method for managing the data accessed by the applications by generating temporary storage devices. A backup agent would manage the generation and execution of the temporary storage devices. The storage devices may be executed in the production host environment, in the backup storage system, or in an additional entity without departing from the invention. A temporary storage device manager may generate the temporary storage devices and populate them with requested data from a FBB stored in the backup storage device. The temporary storage device manager may store a copy of the requested data in the temporary storage device. The application requesting the data may read and/or write to the data in the temporary storage device. The temporary storage device may be used in the generation of future FBBs of the file system used by the application.

Embodiments of the invention further include methods for generating and storing the FBBs in target backup storage devices regardless of the storage protocol implemented by the backup storage systems. Embodiments of the invention include generating the FBB backup, identifying the target backup system to which the FBB is to be stored, identifying the target exposed API(s) provided by the identified backup storage system, and generating an API command based on the identified exposed API(s).

FIG. 1 shows an example system in accordance with one or more embodiments of the invention. The system includes a backup agent (100), one or more clients (120), a production host environment (130) and a backup storage system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the backup agent (100) manages backup operations of data in the production host environment (130). The backup operations may include generating, storing, and/or recovering file based backups (FBBs) stored in the backup storage system (150). In one or more embodiments of the invention, a FBB is a backup of a file system that has been updated, modified, and/or otherwise accessed by the applications (132) in the production host environment (130). The backup agent (100) may perform the method of FIG. 3C-3D to generate the FBBs.

In one or more embodiments of the invention, the backup agent (100) further includes a FBB temporary storage device manager (102) (also referred to as a temporary storage device manager). The temporary storage device manager (102) generates one or more temporary storage devices. Each temporary storage devices may include at least a portion of data in a FBB. The data may be copied from the FBB and stored in the temporary storage device such that the data in the temporary storage devices is accessible by the applications (132). The generation of the temporary storage devices may be performed in accordance with FIG. 3B In one or more embodiments of the invention, the backup agent (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (100) described throughout this application and/or all, or a portion thereof, of the methods illustrated in FIGS. 3A-3D.

In one or more embodiments of the invention, the backup agent (100) is implemented as a logical device. The logical device may utilize the computing resources of any number of computing devices and thereby provide the functionality of the backup agent (100) described throughout this application and/or all, or a portion thereof, of the methods illustrated in FIGS. 3A-3D.

While the backup agent (100) is illustrated in FIG. 1 as being a separate entity, the backup agent (100), and any components thereof, may be executed as part of the production host environment (130), the backup storage system (150), the clients (120), and/or any other entities without departing from the invention.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention.

In one or more embodiments of the invention, the applications (132) generate application data to be utilized for the servicing of the users. The application data may be organized in accordance with a file system. The file system may include any number of files organized into directories. For example, the directories may include paths for accessing the files. The file system may be stored in a container stored in the persistent storage (134) of the production host environment (130).

In one or more of embodiments of the invention, the applications (132) are implemented as computer instructions, e.g., computer code, stored on a persistent storage (e.g., 134) that when executed by a processor(s) of the production host environment (130) cause the production host environment (130) to provide the functionality of the applications (132) described throughout this application.

In one or more embodiments of the invention, the production host environment (130) further includes a FBB metadata file manager (136). In one or more embodiments of the invention, the FBB metadata file manager (136) obtains FBB metadata files, obtains the relevant metadata attributes, and prepares a FBB virtual file system for the applications (132) to use when accessing data in the FBBs stored in the backup storage system (150). The FBB metadata file manager (136) may perform the method of FIG. 3A to generate the FBB virtual file system.

Figure 5:
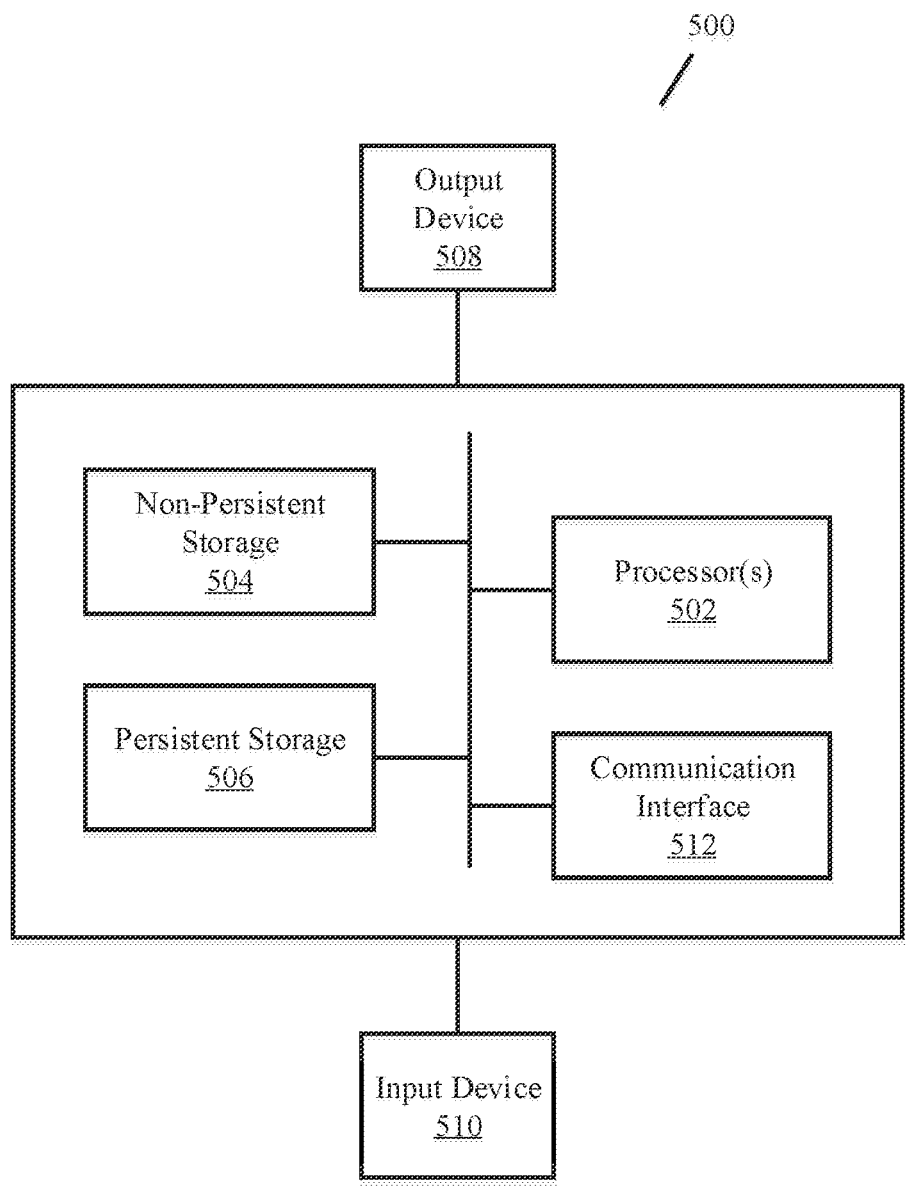
FIG. 5 shows a diagram of a computing device in accordance with one or more embodiments of the invention.

In one or more embodiments of the invention, the production host environment (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host environment (130) described throughout this application.

In one or more embodiments of the invention, the production host environment (130) is implemented as a logical device. The logical device may utilize the computing resources of any number of computing devices and thereby provide the functionality of the production host environment (130) described throughout this application.

In one or more embodiments of the invention, each of the backup storage systems (150) stores FBBs. The FBBs may be backups for file systems. The file systems may be based on files used by the applications (132). The FBBs may each correspond to a point in time of the file system. The FBBs may be used to restore the file system to such corresponding point in time.

In one or more embodiments of the invention, the backup storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
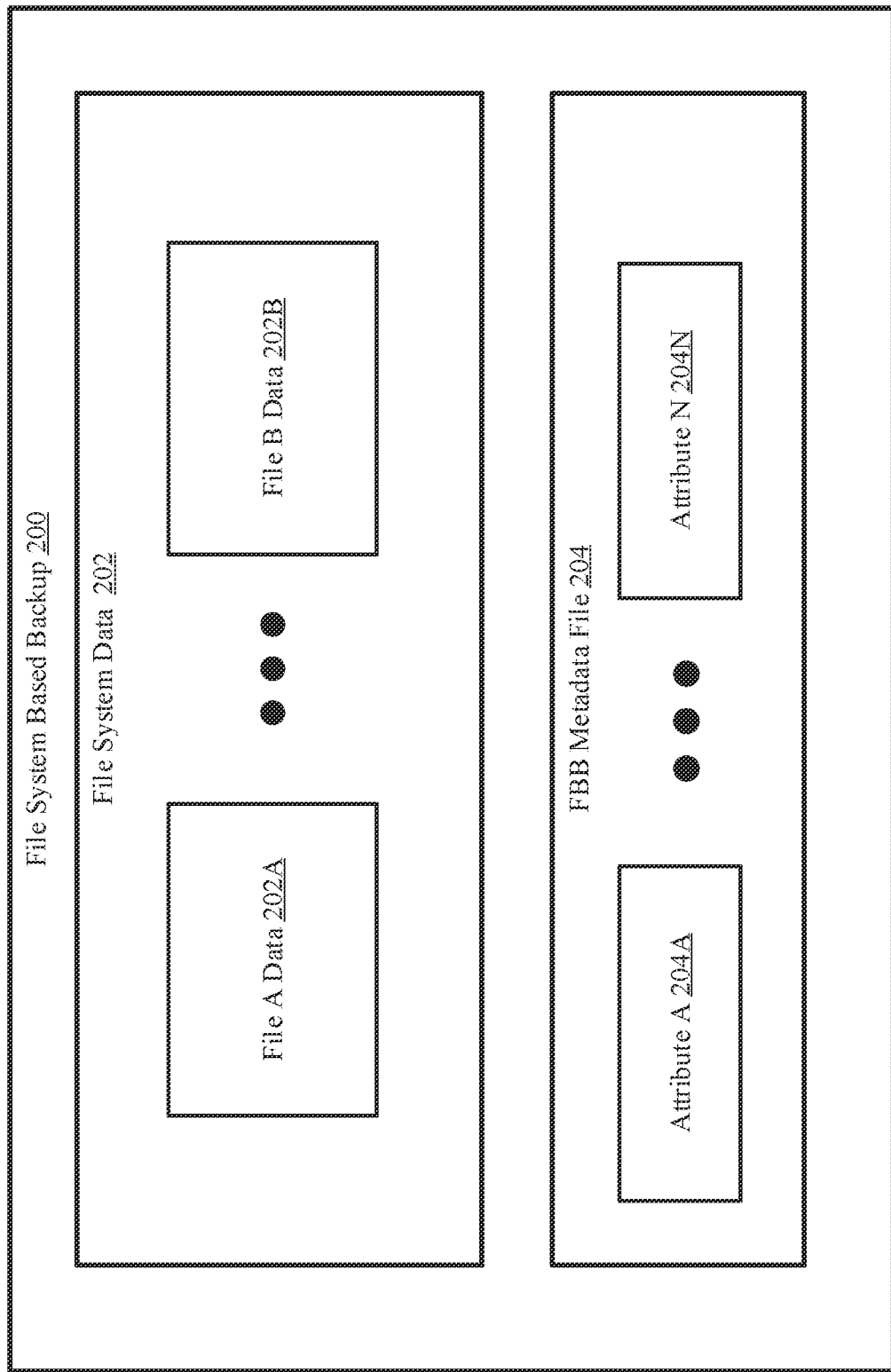
FIG. 2 shows a diagram of a file based backup (FBB) in accordance with one or more embodiments of the invention.

FIG. 2 shows a diagram of a file based backup without departing from the invention. The file based backup (200) may be an embodiment of a file based backup discussed in FIG. 1. As discussed above, the file based backup (200) is a data structure that includes the data in a file system at a point in time. The file based backup (200) may include file system data (202) and a FBB metadata file (204).

In one or more embodiments of the invention, the file system data includes data for one or more files (202A, 202B). Each file data (202A, 202B) may correspond to a file in the file system. The file data (also referred to as file system data) may further include data tags. In one or more embodiments of the invention, the data tags may be associated with the storage format of the file data (202A, 202B). For example, the file data (202A, 202B) may be stored in a common data streaming format (CDSF). In one or more embodiments of the invention, the CDSF may be a format that includes the data tags that may correspond to a portion of data and may specify the FBB corresponding to the portion of data. In this manner, the file data (202A, 202B) may include: (i) the data of the files and/or file system and (ii) the data tags that specify the metadata of one or more portions of data of the file data (202A, 202B).

In one or more embodiments of the invention, the FBB metadata file (204) is a data structure that includes metadata corresponding to the files in the file system data (202). The metadata may include attributes (204A, 204N) of a file. Each attribute may describe an aspect of a file. Examples of attributes (204A, 204N) include, but are not limited to: a file identifier, a parent file identifier, a container identifier, a file size, a hash value of the file data, a checksum value of the file data, a header size, and an offset of the file in which is stored.

In one or more embodiments of the invention, the attributes in the FBB metadata file (204) are grouped into attribute regions. The attribute regions may be groupings of the metadata attributes. The attribute regions may be grouped based on a likelihood of an attribute changing between various iterations of a FBB (e.g., 200).

For example, consider a scenario in which a first attribute (e.g., a file size) changes from a first iteration of a file system of a first FBB to a second iteration of the file system of a second FBB. In contrast, a second attribute (e.g., a file name) may remain the same between the two iterations of the file system. In such scenario, based on their likelihood to change in future iterations of the file system, the first attribute may correspond to a first attribute region, and the second attribute may correspond to a second attribute region.

FIGS. 3A-3D show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3D may be performed in parallel with any other steps shown in FIGS. 3A-3D without departing from the scope of the invention.

Figure 3A:
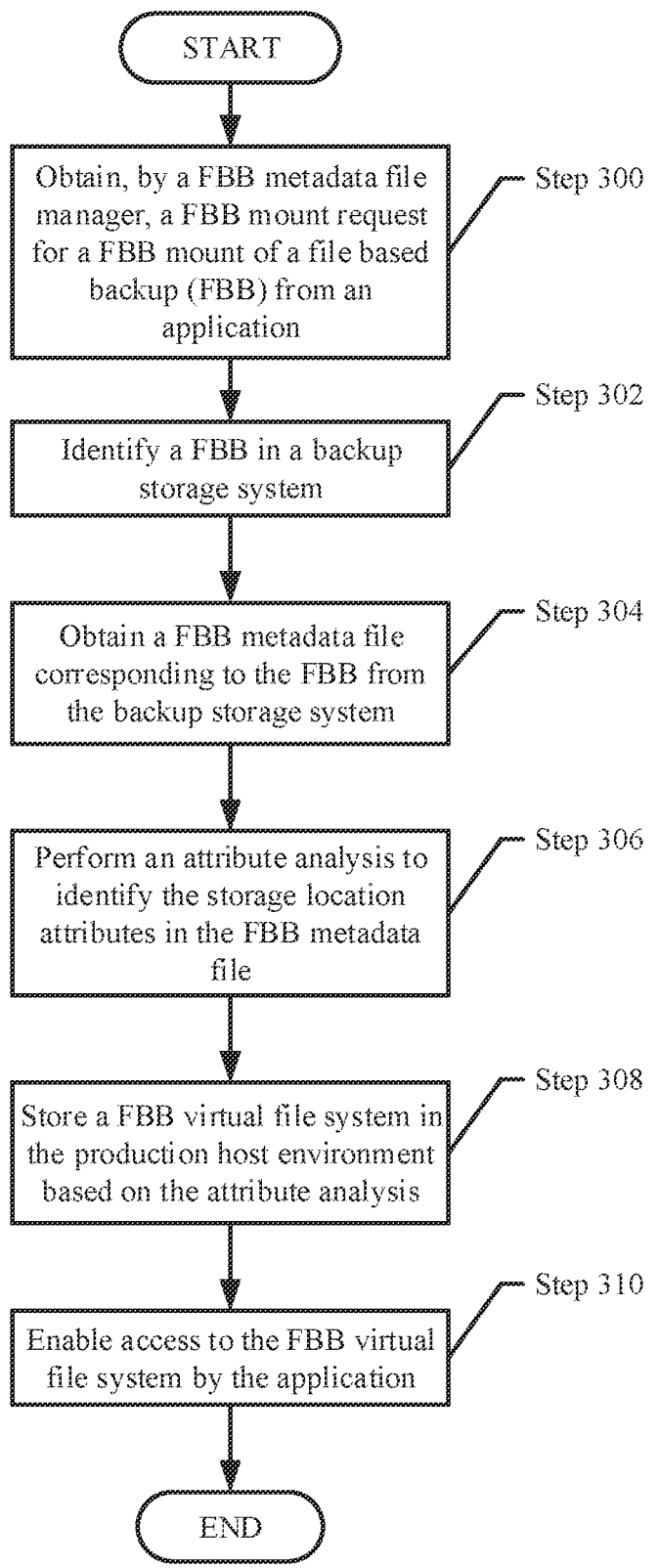
FIG. 3A shows a flowchart for managing instant access of a file based backup in accordance with one or more embodiments of the invention.

FIG. 3A shows a flowchart for managing instant access for a file based backup in accordance with one or more embodiments of the invention. The method shown in FIG. 3A may be performed by, for example, a FBB metadata file manager (e.g., 136, FIG. 1). Other components of the system illustrated in FIG. 1 may perform the method of FIG. 3A without departing from the invention.

Turning to FIG. 3A, in step 300, a FBB mount request for a FBB mount for a FBB is obtained from an application. In one or more embodiments of the invention, the FBB mount request specifies mounting a file system of the FBB in the production host environment such that the application has access to the data (e.g., files) in the FBB. The FBB mount request may specify the point in time associated with the file system.

In step 302, a FBB in a backup storage system is identified. In one or more embodiments of the invention, the FBB is identified based on the specified point in time in the FBB mount request. Further, the FBB may be identified based on the specified file system. The FBB metadata file manager (or other entity) may analyze the FBBs stored in the backup storage system to identify a FBB that corresponds to the requested file system and/or point in time.

In step 304, a FBB metadata file corresponding to the FBB is obtained from the backup storage system. In one or more embodiments of the invention, the FBB metadata file manager may send a request (e.g., as an API command) to the backup storage system that specifies the FBB metadata file of the identified FBB.

In step 306, an attribute analysis is performed on attributes specified in the FBB metadata file to identify storage location attributes in the FBB metadata file. In one or more embodiments of the invention, the attribute analysis is a process for analyzing the attributes specified in the FBB metadata file that specify the storage location of the data and enable access to the data. Such attributes may include, but are not limited to: an offset of a portion of data in a storage device, a size of the portion of data, a file name corresponding to the portion of data, and a file path based on the file system.

In step 308, a FBB virtual file system is stored in the production host environment based on the attribute analysis. In one or more embodiments of the invention, the FBB virtual file system is an organization of the storage attributes such that the application may access (e.g., read) data of the file system from the FBB. The FBB virtual file system would be organized on a file-storage basis such that the FBB virtual file system would specify each file in the file system of the FBB and the storage of the data corresponding to each file.

In step 310, access to the FBB virtual file system by the application is enabled. In one or more embodiments of the invention, the access includes establishing the organization of the FBB virtual file system so that the application may send read requests for the data (e.g., one or more files) in the FBB. The entity servicing the read request (e.g., a driver in the production host environment) may utilize the FBB virtual file system to identify the file(s), the storage location of the data corresponding to the file(s), and send API requests to the backup storage system to obtain the specified data.

In one or more embodiments of the invention, the access to the FBB virtual file system may include obtaining a read request for the file system data in the FBB. The file system data may include files. The entity (e.g., the FBB metadata file manager) managing the FBB virtual file system may identify a file path corresponding to the requested data. The file path may specify the portions of data corresponding to the requested files. Based on the identified file path, the requested data may be obtained from the backup storage system. For example, a copy of the requested data may be generated and provided to the application.

Figure 3B:
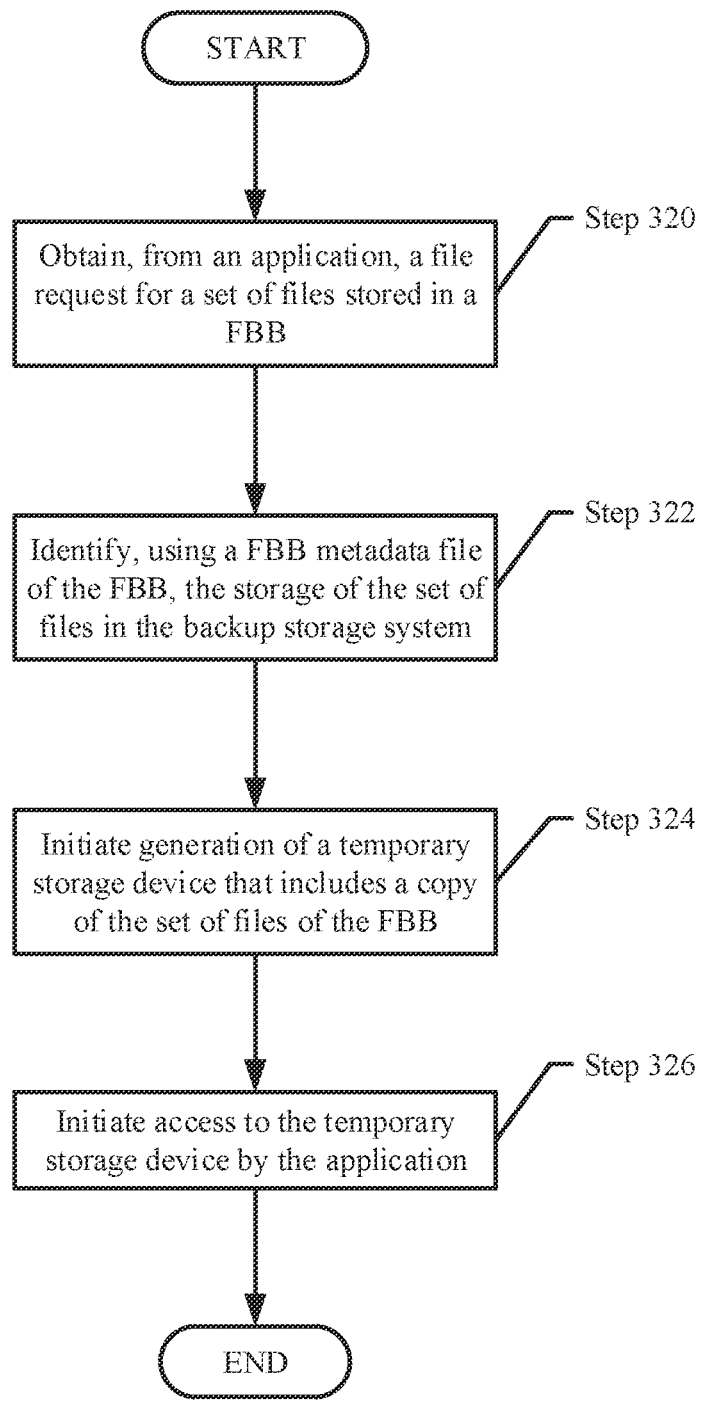
FIG. 3B shows a flowchart for managing temporary storage devices in accordance with one or more embodiments of the invention.

In one or more embodiments of the invention, the read request may be serviced in accordance with FIG. 3B. The read request may be serviced in accordance with any other method without departing from the invention.

FIG. 3B shows a flowchart for managing temporary storage devices in accordance with one or more embodiments of the invention. The method shown in FIG. 3B may be performed by, for example, a FBB temporary storage device manager (e.g., 102, FIG. 1). Other components of the system illustrated in FIG. 1 may perform the method of FIG. 3B without departing from the invention.

In step 320, a file request for a set of one or more files stored in a FBB is obtained from an application. The file request may specify a desire to write, read from, and/or otherwise access the set of files from the FBB.

In step 322, the storage of the set of files is identified in the backup storage system. In one or more embodiments of the invention, the storage of the set of files is identified using a FBB virtual file system. The FBB virtual file system may specify each of the set of files and the storage locations of the set of files in the backup storage system.

In step 324, generation of a temporary storage device is initiated that includes a copy of the set of files of the FBB. In one or more embodiments of the invention, the temporary storage device is generated by partitioning a portion of the storage of the backup agent (or other entity managing the temporary storage devices) to be reserved for the set of files. The temporary storage device may be populated with a copy of the data from the FBB. The copy may be generated without the data tags of the file system data. In this manner, the data corresponding to the set of files may be organized to enable access to the data by the application without the data tags interrupting the access to the data.

In step 326, access to the temporary storage device is initiated by the application. In one or more embodiments of the invention, the generation of the temporary storage device results in an update to the FBB virtual file system such that the application may access the data in the temporary storage device via the FBB virtual file system. In one or more embodiments of the invention, the access includes allowing the application to read from, write to, and/or otherwise modify the data in the temporary storage device via the FBB virtual file system. Any modifications to the data by the application may be stored and tracked in the temporary storage device.

In one or more embodiments of the invention, the temporary storage device may be deleted following a generation of a FBB of the file system to which the data in the temporary storage device corresponds to. The FBB may be generated in accordance with FIG. 3B and/or FIG. 3C. The FBB may be generated via any other process without departing from the invention. Further, the temporary storage device may be deleted based on any other policy without departing from the invention.

Figure 3C:
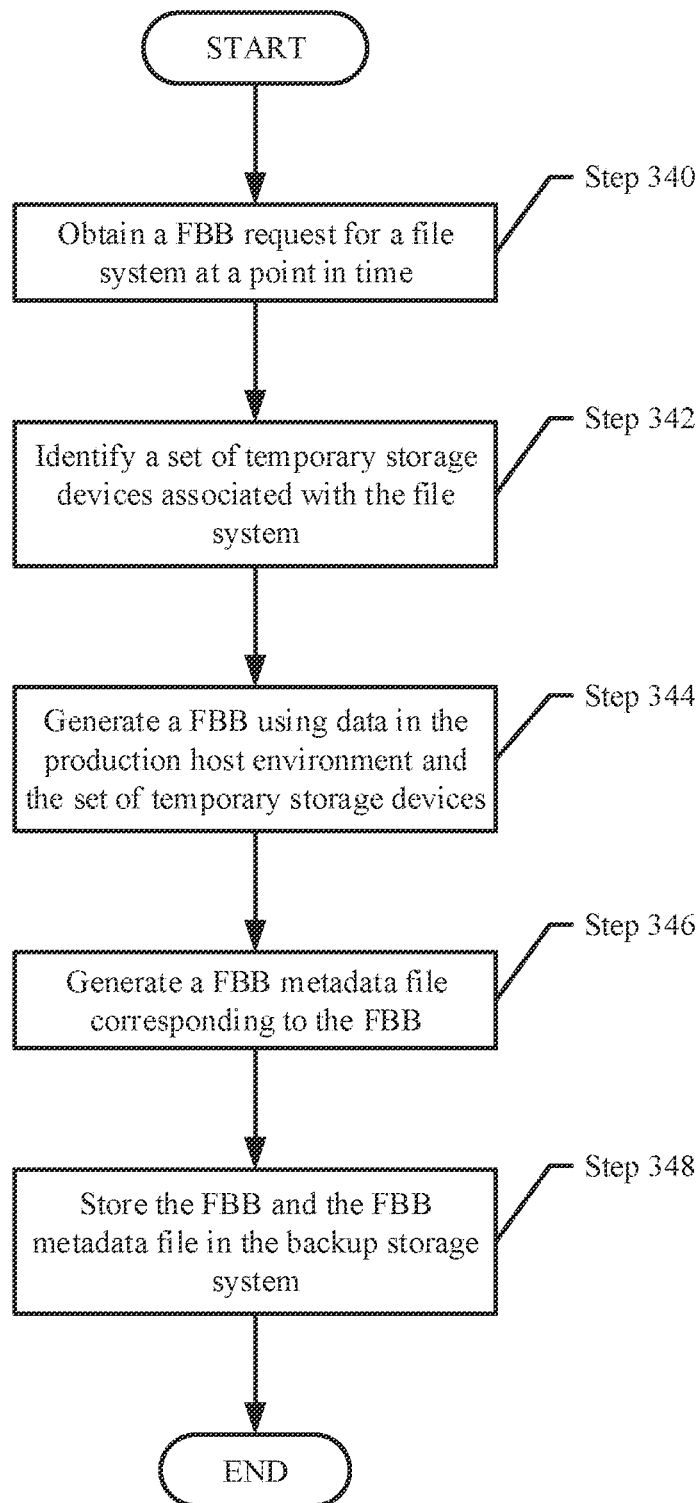
FIG. 3C shows a flowchart for generating and storing a file based backup in accordance with one or more embodiments of the invention.

FIG. 3C shows a flowchart for generating and storing a file based backup in accordance with one or more embodiments of the invention. The method shown in FIG. 3C may be performed by, for example, a backup agent (e.g., 100, FIG. 1). Other components of the system illustrated in FIG. 1 may perform the method of FIG. 3C without departing from the invention.

In step 340, a FBB request is obtained for a file system at a point in time. The FBB request may specify generating and storing a FBB of the file system at the point in time. The FBB request may specify the backup storage system in which the FBB is to be stored.

In step 342, a set of temporary storage devices associated with the file system. In one or more embodiments of the invention, the set of temporary storage devices that are identified are those that have been generated based on the file system. The temporary storage devices may be identified based on temporary storage device identifiers of the temporary storage devices. Each of the temporary storage devices may specify the file system and/or a set of data corresponding to the file system.

In step 344, generating a FBB using data in the production host environment and the set of temporary storage devices. In one or more embodiments of the invention, the FBB is generated by generating a copy of the data in the production host environment, generating a copy of the data in the set of temporary storage devices, replacing any data in the production host environment with the corresponding data in the set of temporary storage devices.

In step 346, generating a FBB metadata file corresponding to the FBB. In one or more embodiments of the invention, the FBB metadata file is generated by generating metadata attributes corresponding to each file in the file system. The metadata file may be populated based on the corresponding attributes of the copy of the data generated in step 344 (e.g., file name identifiers, file size, etc.). The storage location attributes of the FBB metadata file may be generated based on the storage of the FBB in the backup storage system as performed in step 348.

In step 348, the FBB and the FBB metadata file is stored in the backup storage system. In one or more embodiments of the invention, the storage includes storing the FBB in a CDSF. The storage of the FBB may include generating data tags for portions of the data in the FBB, storing the data tags with the portions of the data, and tracking the storage of the data in the FBB metadata file.

Figure 3D:
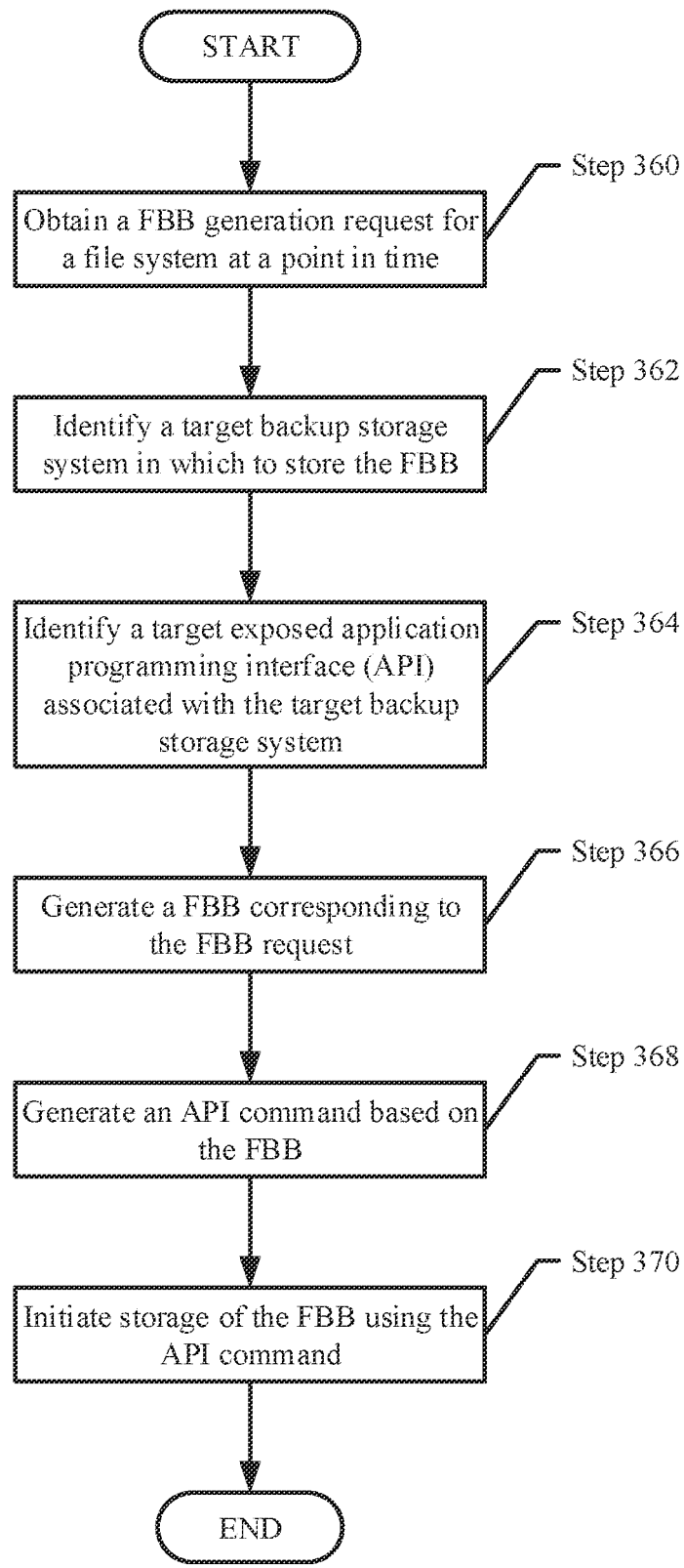
FIG. 3D shows a flowchart for generating and storing a file based backup based on a target backup storage system in accordance with one or more embodiments of the invention.

FIG. 3D shows a flowchart for generating and storing a file based backup based on a target backup storage system in accordance with one or more embodiments of the invention. The method shown in FIG. 3D may be performed by, for example, a backup agent (e.g., 100, FIG. 1). Other components of the system illustrated in FIG. 1 may perform the method of FIG. 3D without departing from the invention.

In step 360, a FBB generation request for a file system at a point in time is obtained. The FBB generation request may specify generating and storing a FBB of the file system at the point in time. The FBB request may specify the backup storage system in which the FBB is to be stored. Alternatively, the backup storage system may not be specified in the FBB generation request.

In step 362, a target backup storage system in which to store the FBB is identified. In such embodiments in which the FBB generation request does not specify the target backup storage system, the backup agent may identify the target backup storage system by identifying the connection to one or more backup storage systems, determining one of the backup storage systems that may store the FBB in a CDSF. The backup agent may select, from the determined backup storage systems, a target storage system.

In step 364, a target exposed API associated with the target backup storage system is identified. In one or more embodiments of the invention, following the selection and/or identification of the target backup storage system, the backup agent may identify a target exposed API of the target backup storage system by establishing a connection with the target backup storage system, sending a request of the API protocol implemented by the target backup storage system, and obtaining a response from the target backup storage system.

In step 366, a FBB is generated corresponding to the FBB generation request. In one or more embodiments of the invention, the FBB is generated by generating a copy of the data in the production host environment, generating a copy of the data in a set of temporary storage devices, replacing any data in the production host environment with the corresponding data in the set of temporary storage devices.

In step 368, an API command is generated based on the FBB. In one or more embodiments of the invention, the API command specifies the storage of the FBB in the CDSF. The API command may be generated based on the exposed API identified for the target backup storage system.

In step 370, storage of the FBB is initiated using the API command. In one or more embodiments of the invention, the API command is sent to the target backup storage system. The API command may include, or otherwise reference, the FBB. The target backup storage system may perform the storage of the FBB in the CDSF.

Example

Figure 4A:
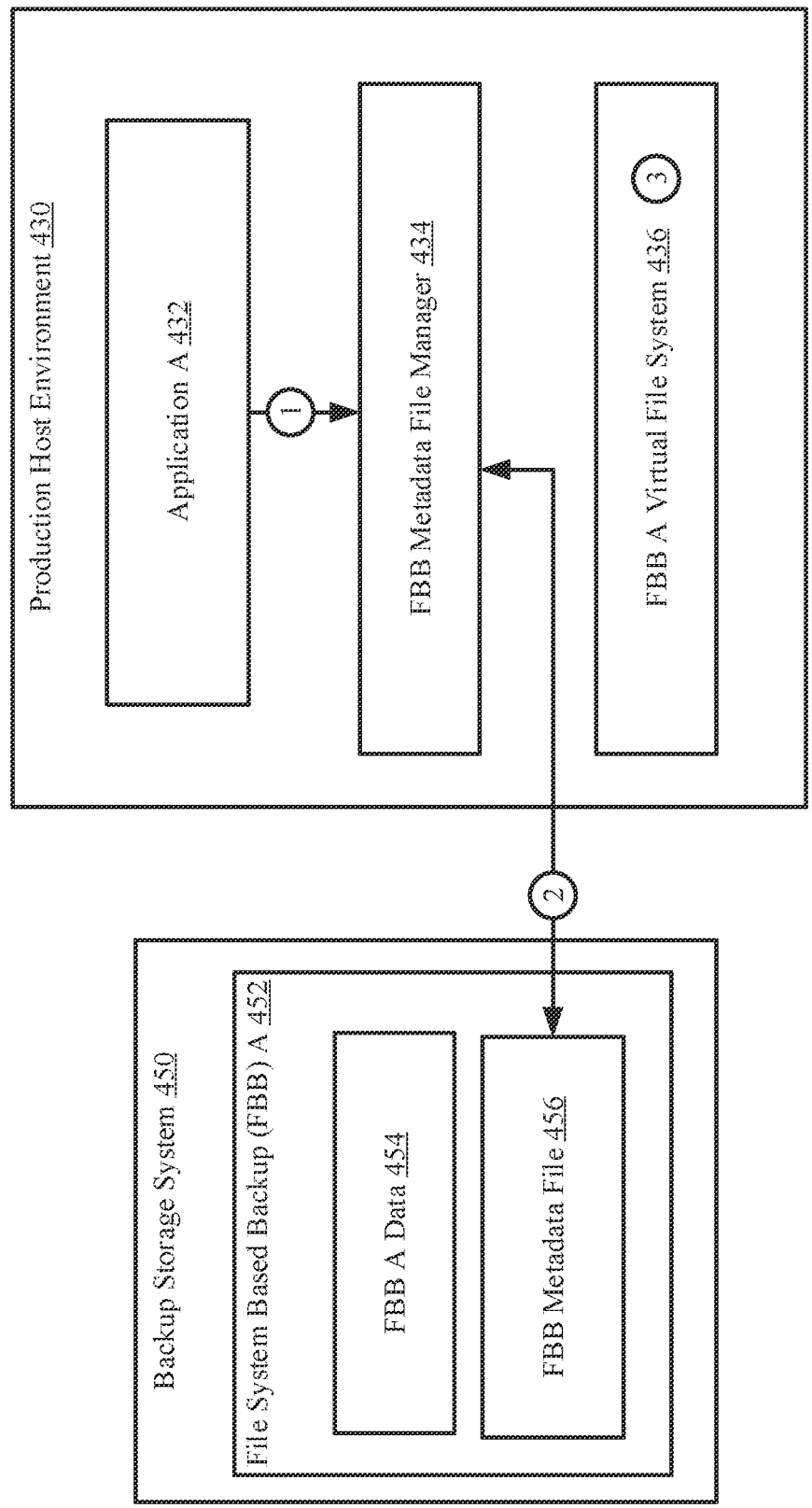
FIGS. 4A-4C show an example in accordance with one or more embodiments of the invention.
Figure 4B:
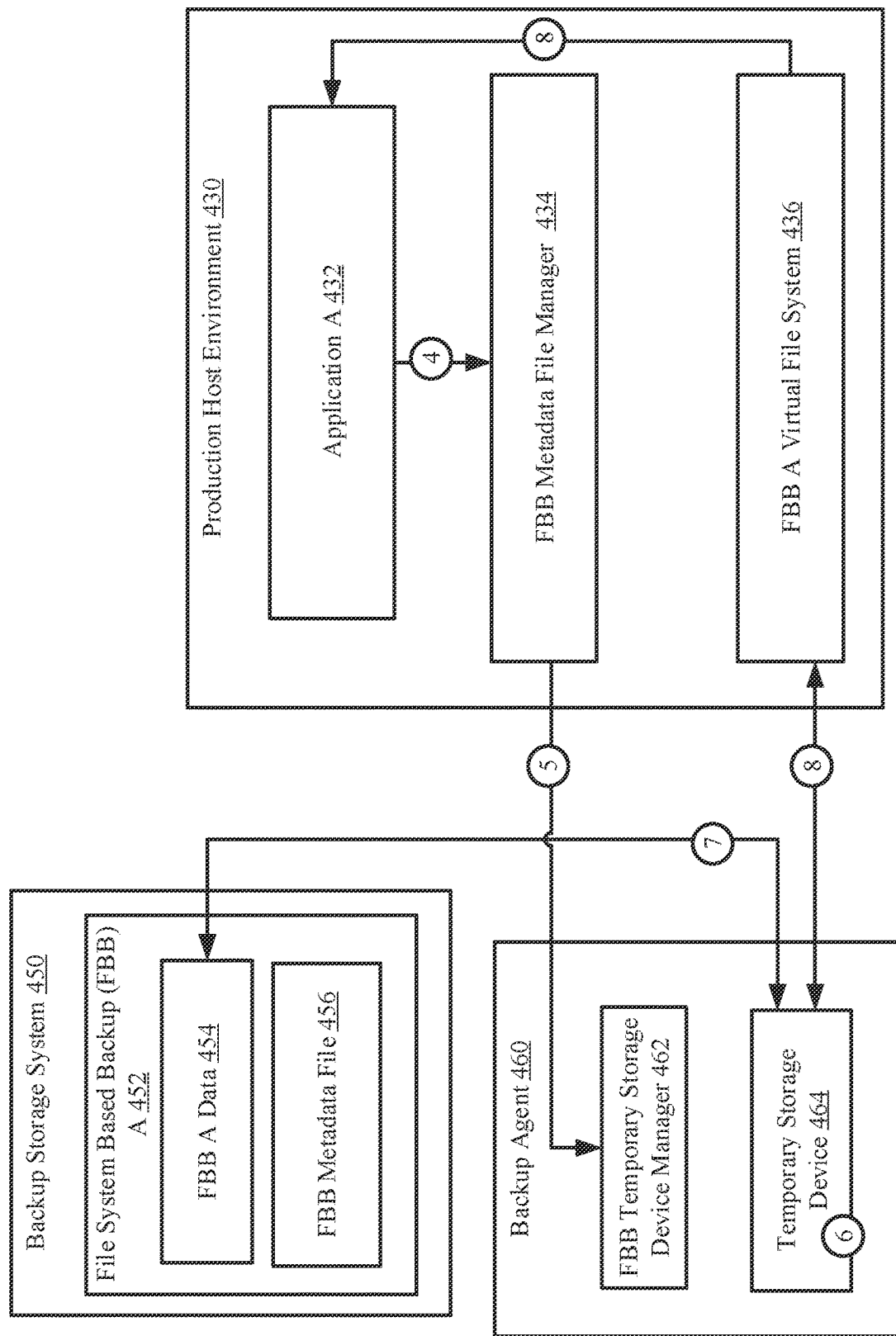
Figure 4C:
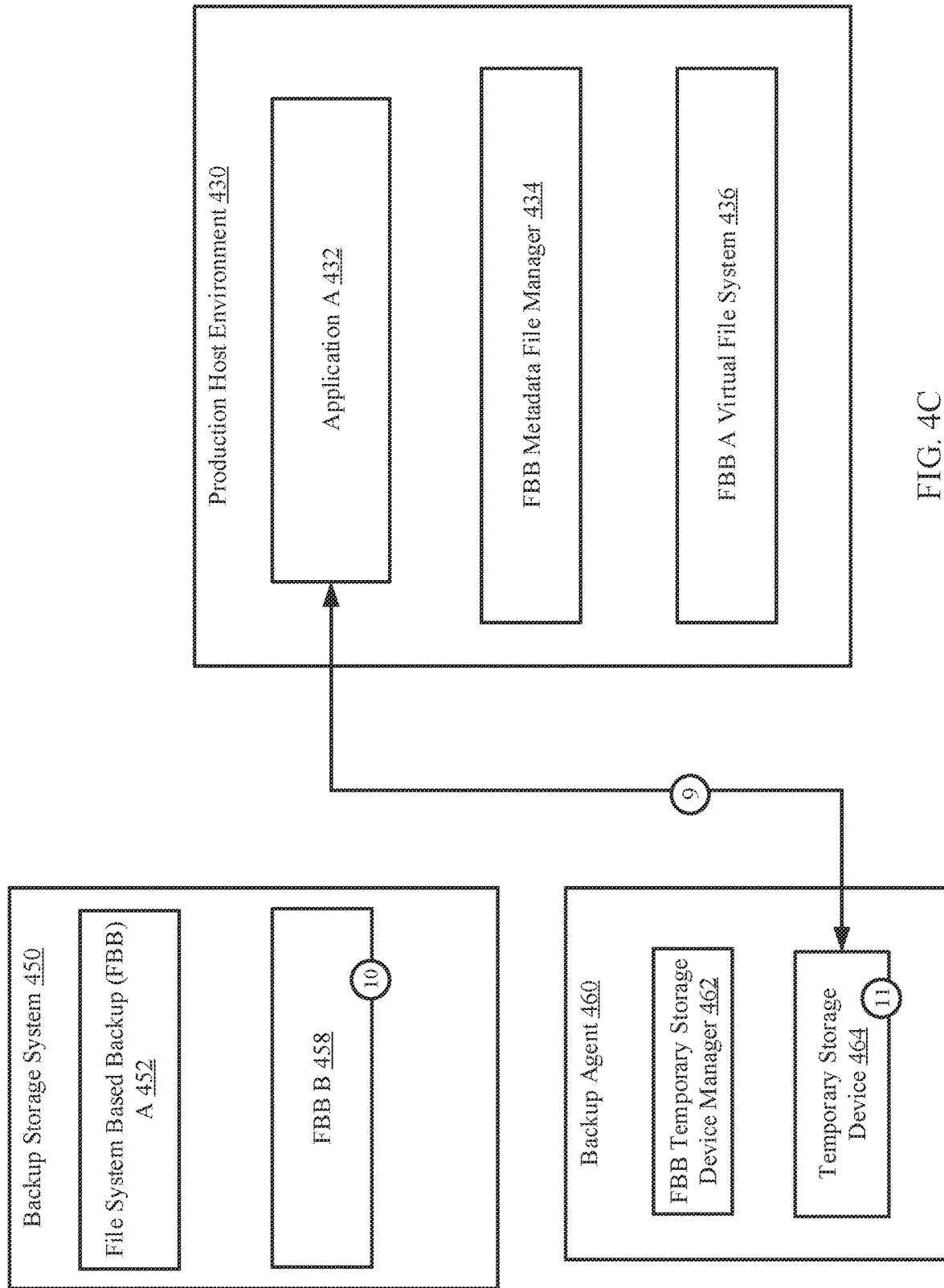

The following section describes an example. The example, illustrated in FIGS. 4A-4C, is not intended to limit the invention and is independent from any other examples discussed in this application. Turning to the example, consider a scenario in which a backup storage system stores a file based backup (FBB) in a common data streaming format (CDSF).

FIG. 4A shows a diagram of an example system. The example system includes a backup storage system (450) and a production host environment (430). For the sake of brevity, not all components of the example system are illustrated in FIG. 4A. The backup storage system (450) includes FBB A (452) which includes FBB A data (454) and a FBB metadata file (456). The production host environment includes an application A (432) and a FBB metadata file manager (434).

Application A (432) sends a FBB mount request to the FBB metadata file manager (434) that specifies the mounting of FBB A (452) for access by application A (432) [1].

The FBB metadata file manager (434) performs the method of FIG. 3A to mount FBB A (452). Specifically, the FBB metadata file manager (434) obtains relevant attributes from the FBB metadata file (456) such as the storage location, file names, and file paths of the FFB A data A (454) [2]. The FBB metadata file manager (434) utilizes the relevant attributes to generate a FBB A virtual file system (436) [3]. The FBB virtual file system (436) specifies each file in the file system of the FBB (452) and the storage location of each file in the backup storage system (450). The FBB virtual file system (436) further includes the file paths used for accessing by the application (432).

FIG. 4B shows a diagram of the example system at a later point in time. The example system further includes a backup agent (460). For the sake of brevity, not all components of the example system are illustrated in FIG. 4B. Following the generation of the FBB virtual file system (436), the application A (432) sends a file request for a file in the file system stored in FBB A (454) [4]. The file request specifies the file to be written. Based on the file request, the FBB metadata file manager (434) performs the method of FIG. 3B to service the file request. Specifically, the FBB temporary storage device manager (462) initiates generation of a temporary storage device by providing the file path, the specified file, and the storage location of the data of the file to a FBB temporary storage device manager (462) of the backup agent (460) [5].

The FBB temporary storage device manager (462) utilizes the obtained information to generate a temporary storage device (464) [6]. The FBB temporary storage device manager (462) populates the temporary storage device (464) with a copy of the requested file generated from FBB A (452) in the backup storage system (450) [7]. The storage of the copy of the file in the temporary storage device (464) is provided to the FBB virtual file system (436).

Following the generation of the temporary storage system (464), application A (432) sends write requests using the FBB A virtual file system (436) that specify writing to the file in the temporary storage device (464). The file may be written to in accordance with the write request in the temporary storage device (464) [8].

FIG. 4C shows a diagram of the example system at a later point in time. At the later point in time, the backup agent (460) initiates generation of a FBB at a later point in time. The generation is performed in accordance with FIG. 3C. Specifically, the backup agent (460) obtains the data from the application (432) and further obtains the data from the temporary storage device (464) to generate a copy of the data [9]. The copy of the data is stored in the backup storage device (450) as FBB B (458) [10].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD)

drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the operation of the storage and access of data for file systems stored in backups stored in a backup storage system. Embodiments of the invention provide a use of a virtual file system that is tailored to access data for a file based backup that is stored in a format that would otherwise make access to such data difficult.

Embodiments of the invention further include providing temporary storage devices for requested data in the file based backup to be accessed by applications. The use of the temporary storage devices prevent modifications to the data in the file based backups, which would be undesirable when restoring the file system to a previous point in time. Further, the data in the temporary storage device may be used for future backups of the file system.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing file based backups (FBBs), the method comprising:

obtaining, by a FBB metadata file manager and by an application, a file request for a file stored in a FBB, wherein the FBB is stored in a backup storage system;

identifying, using a FBB metadata file of the FBB, a storage location of the file, and wherein the FBB comprises file system data and the FBB metadata file;

initiating generation of a temporary storage device, wherein initiating the generation of the temporary storage device comprises prompting a FBB temporary storage device manager of a backup agent to partition a portion of storage of the backup agent for the temporary storage device;

storing, by the FBB temporary storage device manager, a copy of the file in the temporary storage device using the storage location and the FBB;

initiating, after the storing, access to the copy of the file for the application;

writing, based on a write request obtained from the application, to the copy of the file in the temporary storage device to obtain an updated copy of the file;

deleting the temporary storage device in response to generation of a second FBB, wherein the second FBB corresponds to the updated copy of the file;

prior to obtaining the file request:

obtaining, by the FBB metadata file manager, a FBB mount request for a FBB mount of the FBB from the application, wherein the application is executing in a production host environment;

in response to the FBB mount request:

identifying the FBB in a backup storage system;

obtaining the FBB metadata file corresponding to the FBB from the backup storage system;

performing an attribute analysis to identify attributes of the storage location in the FBB metadata file;

storing a FBB virtual file system in the production host environment using the attributes of the storage location;

enabling access to the FBB virtual file system by the application, wherein enabling access to the FBB virtual file system comprises:

obtaining a read request for data in the file system data from the application;

identifying, using the FBB virtual file system, a file path based on the storage of the file system data in the backup storage system; and based on the file path, obtaining the data from the backup storage system; and providing the data to the application.

2. The method of claim 1, wherein the FBB is stored in a common data streaming format (CDSF).

3. The method of claim 1, wherein the attributes of the storage location comprise at least one of: a file identifier attribute, a parent file identifier and a container identifier, a file size, a hash value of a file, and an offset of the file.

4. The method of claim 1, wherein the file system data comprises data tags.

5. A non-transitory computer readable medium comprising computer readable program code, which when executed by a computer processor enables the computer processor to perform a method for managing file based backups (FBBs), the method comprising:

obtaining, by a FBB metadata file manager and by an application, a file request for a file stored in a FBB, wherein the FBB is stored in a backup storage system;

identifying, using a FBB metadata file of the FBB, a storage location of the file, wherein the FBB comprises file system data and the FBB metadata file;

initiating generation of a temporary storage device, wherein initiating the generation of the temporary storage device comprises prompting a FBB temporary storage device manager of a backup agent to partition a portion of storage of the backup agent for the temporary storage device;

storing, by the FBB temporary storage device manager, a copy of the file in the temporary storage device using the storage location and the FBB;

initiating, after the storing, access to the copy of the file for the application;

writing, based on a write request obtained from the application, to the copy of the file in the temporary storage device to obtain an updated copy of the file;

deleting the temporary storage device in response to generation of a second FBB, wherein the second FBB corresponds to the updated copy of the file;

prior to obtaining the file request:
  obtaining, by the FBB metadata file manager, a FBB mount request for a FBB mount of the FBB from the application, wherein the application is executing in a production host environment;
  in response to the FBB mount request:
    identifying the FBB in a backup storage system;
    obtaining the FBB metadata file corresponding to the FBB from the backup storage system;
    performing an attribute analysis to identify attributes of the storage location in the FBB metadata file;
    storing a FBB virtual file system in the production host environment using the attributes of the storage location;
    enabling access to the FBB virtual file system by the application, wherein enabling access to the FBB virtual file system comprises:
      obtaining a read request for data in the file system data from the application;
      identifying, using the FBB virtual file system, a file path based on the storage of the file system data in the backup storage system; and
      based on the file path, obtaining the data from the backup storage system; and
      providing the data to the application.

6. The non-transitory computer readable medium of claim 5, wherein the FBB is stored in a common data streaming format (CDSF).

7. The non-transitory computer readable medium of claim 5, wherein the attributes of the storage location attributes comprise at least one of: a file identifier attribute, a parent file identifier and a container identifier, a file size, a hash value of a file, and an offset of the file.

8. The non-transitory computer readable medium of claim 5, wherein the file system data comprises data tags.

9. A system comprising:
a processor; and
memory comprising instructions, which when executed by the processor, perform a method comprising:
  obtaining, by a FBB metadata file manager and by an application, a file request for a file stored in a FBB, wherein the FBB is stored in a backup storage system;
  identifying, using a FBB metadata file of the FBB, a storage location of the file, wherein the FBB comprises file system data and the FBB metadata file;
  initiating generation of a temporary storage device, wherein initiating the generation of the temporary storage device comprises prompting a FBB temporary storage device manager of a backup agent to partition a portion of storage of the backup agent for the temporary storage device;
  storing, by the FBB temporary storage device manager, a copy of the file in the temporary storage device using the storage location and the FBB;
  initiating, after the storing, access to the copy of the file for the application;
  writing, based on a write request obtained from the application, to the copy of the file in the temporary storage device to obtain an updated copy of the file;
  deleting the temporary storage device in response to generation of a second FBB, wherein the second FBB corresponds to the updated copy of the file;
  prior to obtaining the file request:
    obtaining, by the FBB metadata file manager, a FBB mount request for a FBB mount of the FBB from the application, wherein the application is executing in a production host environment;
    in response to the FBB mount request:
      identifying the FBB in a backup storage system;
      obtaining the FBB metadata file corresponding to the FBB from the backup storage system;
      performing an attribute analysis to identify attributes of the storage location in the FBB metadata file;
      storing a FBB virtual file system in the production host environment using the attributes of the storage location;
      enabling access to the FBB virtual file system by the application, wherein enabling access to the FBB virtual file system comprises:
        obtaining a read request for data in the file system data from the application;
        identifying, using the FBB virtual file system, a file path based on the storage of the file system data in the backup storage system; and
        based on the file path, obtaining the data from the backup storage system; and
        providing the data to the application.

10. The system of claim 9, wherein the FBB is stored in a common data streaming format (CDSF).

11. The system of claim 9, wherein the attributes of the storage location comprise at least one of: a file identifier attribute, a parent file identifier and a container identifier, a file size, a hash value of a file, and an offset of the file.

* * * * *